United States Patent [19]

Priest

[11] Patent Number: 5,079,976
[45] Date of Patent: Jan. 14, 1992

[54] TIRE CHAIN INSTALLATION TOOL FOR DUAL WHEELS

[75] Inventor: M. Dean Priest, Billings, Mont.

[73] Assignee: Bruce A. McPherson d/b/a The Montana Connection, Missouri City, Tex.

[21] Appl. No.: 569,202

[22] Filed: Aug. 20, 1990

[51] Int. Cl.$^5$ .................................. B60C 27/06
[52] U.S. Cl. ....................................... 81/15.8
[58] Field of Search ................ 81/15.8; 152/213 R, 152/213 A

[56] References Cited

U.S. PATENT DOCUMENTS 3,408,884 11/1968 Musgrove ..................... 81/15.8
4,411,176 10/1983 Mason ........................... 81/15.8

Primary Examiner—James G. Smith
Attorney, Agent, or Firm—James L. Jackson

[57] ABSTRACT

A tool is provided for installation of tire chains on the dual drive wheel assemblies having wheels with openings therein. The tool comprises a central elongate projection having a tool restraint opening at its inner extremity which is adapted for registry with two of the wheel rim openings and receives an impement extended through the wheel rim openings for establishing an interlocked relation between the wheel rims and the tool. A pair of generally U-shaped side projections are formed integrally with the central projection and extend in diverging relation and in opposed aligned directions. Each of the side projections are provided with chain positioner elements adapted to extend radially inwardly along the side wall of the respective tire. The tool is provided with a central chain connector and said side chain connectors to which the central and side chain rails of the tire chain are attached respectively. The chain connector elements cause the tire chain to be wrapped about the dual wheel drive upon one revolution of wheel movement after which the tool is removed and the ends of the tire chain rails are locked in assembly for use.

18 Claims, 2 Drawing Sheets

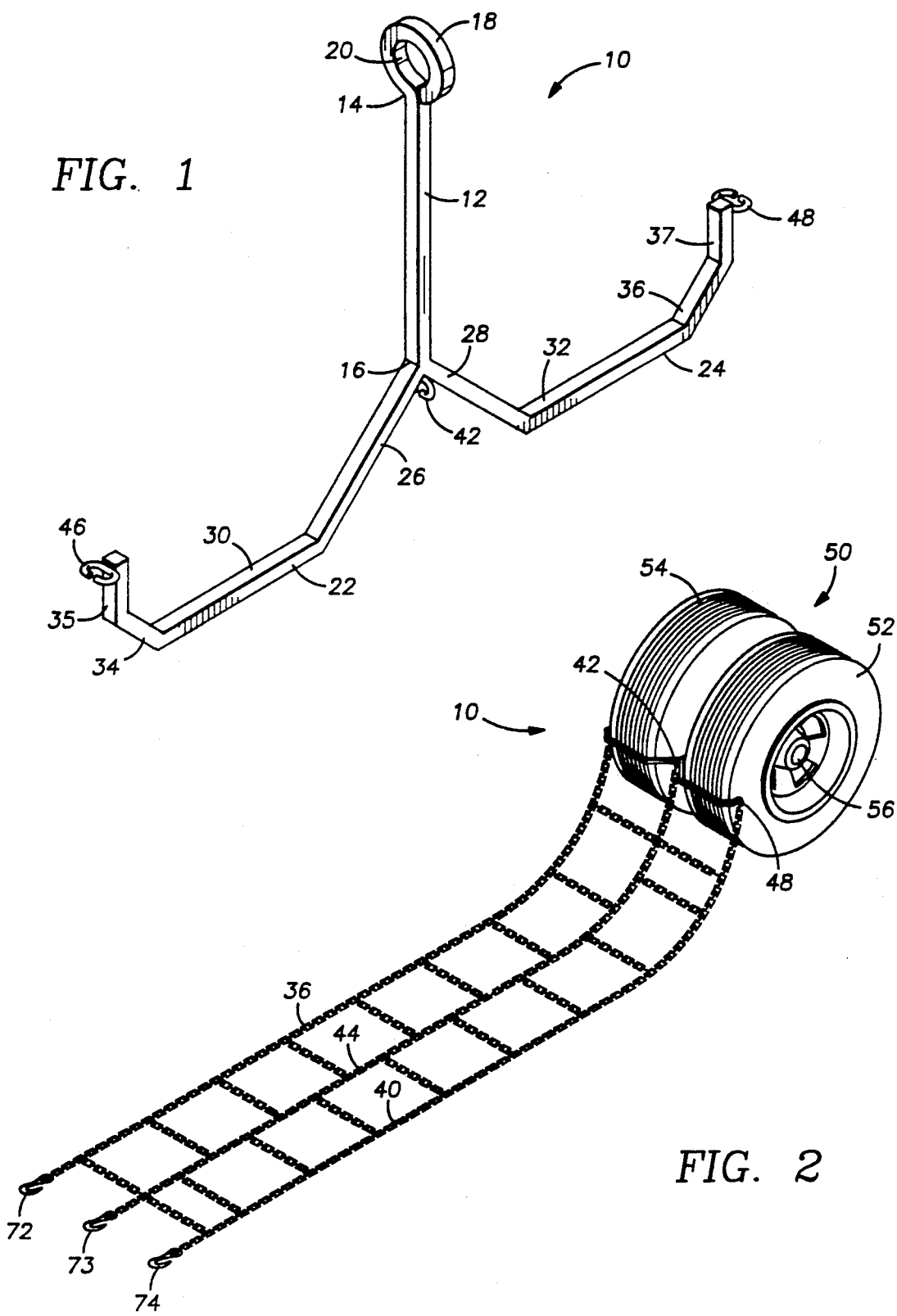

TIRE CHAIN INSTALLATION TOOL FOR DUAL WHEELS

FIELD OF THE INVENTION

This invention relates generally to the application of tire chains to the drive wheels of vehicles for use on slippery roadways. More specifically, the present invention is directed to a tool having the capability of being releasably interconnected with the rim of a dual wheel to provide for installation of tire chains thereon.

1. Background of the Invention

In the transportation industry large tractor trailer rigs are commonly employed for transportation of goods. The competitive nature of the industry typically requires that tractor trailers operate throughout a wide range of weather conditions, including rain and snow and that they operate on road surfaces that are rendered slippery or otherwise hazardous by accumulation of snow, ice, mud, etc.

For operation of vehicles on hazardous road surfaces, traction and thus the safety of the vehicle is materially enhanced through the use of chains that are placed about the periphery of the tires and function to cooperate with the tire treads to enhance traction of the tires. The installation of tire chains on dual wheels typically requires the operator of the tractor trailer rig to crawl beneath the tractor and trailer in order to manipulate the chains and fasten them about the dual drive wheels of the tractor and the dual wheels of the trailer. This activity is time consuming, dirty, often wet and difficult to accomplish often times causing back injuries resulting in workman's compensation and medical insurance claims. In many cases the space between the tires and rims of dual wheels become clogged with ice, mud or other debris which must be forcibly removed to permit installation of the chains.

2. Description of the Prior Art

A number of devices have been developed over the years to provide for installation of chains on the tires of vehicles. Several devices have also been developed specifically for dual wheels to permit installation of tire chains thereon. U.S. Pat. No. 2,946,337 of Ambeau, U.S. Pat. No. 3,408,884 of Musgrove, U.S. Pat. No. 3,547,177 of Balley and U.S. Pat. No. 4,411,176 of Mason each depict devices that are designed for installation of dual wheel tire chains. Almost without exception these prior art chain installation devices are unacceptable because of the difficulty of attaching them to the tires or rims of the dual wheels, especially under circumstances where the space between the tires and rims is clogged with debris. In some cases the tire chain installation devices attach to the wheels by friction. Thus the heavy weight of dual wheel chains can overcome the frictional assembly of the installation tool with the wheels, thus causing it to fall off or mislocate the chain assembly relative to the wheels.

SUMMARY OF THE INVENTION

It is therefore a principle feature of the present invention to provide a novel tool for installation of dual wheel tire chains which is capable of being simply and efficiently applied in structurally interconnected relation with the rim of at least one and preferably both of the wheels of a dual wheel assembly even under circumstances where the spaces between the tires and rims may be clogged with debris, such as snow, ice, mud, etc.

It is also a feature of this invention to provide a novel tool for installation of dual wheel chains which enables secure positioning of the chains about the tires of dual wheels simply by moving the vehicle sufficiently to rotate the dual wheels one revolution.

It is an even further feature of this invention to provide a novel tool for the installation of dual wheel chains which enables the chains of both sets of dual wheels, through the use of two tools (one tool on each set of dual wheels), to be simultaneously installed, thus minimizing the time and effort for preparation of the vehicle for operation on slippery road surfaces.

Briefly, the present invention comprises a tool for installation of dual wheel tire chains on any dual drive wheels of tractors or trucks or rear dual wheel sets on trailers having rim assemblies with hubs that are provided with a plurality of holes as is typically the case. A tool constructed in accordance with the present invention is a rigid device of unitary structure having a central projection that is adapted to extend into the space between the dual tires and rims of a dual wheel assembly. The central projection is designed to be very effective for removal of accumulation of debris such as snow, ice, mud, etc. between the wheels. The central projection is provided with a tool restraint opening at its free or inner end which opening is provided for registry with one of the plurality of openings in the hub portion of the rim assembly. The tool restraint opening is adapted to receive any suitable restraint implement such as a bar, hammer handle, etc. that is extended through the wheel openings and the tool restraint opening, thus establishing an interlocking relation between the wheels and the central projection portion of the tool. A central chain connector element is also provided on the central projection and is located at or near the opposite end of the central projection from the tool restraint opening. This chain connector is provided for releasable connection of the central chain rail of a dual wheel chain assembly thereto.

A pair of side projections extend in opposed directions from the central projection and have portions that overlie the respective treads of the tires of the dual wheel assembly. The side projections each include terminal chain rail positioning portions that are adapted to extend along the inner and outer side walls of the respective tires of the dual wheel assembly. Each of these side projections is provided with a chain connector for releasable attachment to the side rail chains of a dual wheel tire chain assembly. The chain connectors of the side projections and the central projection are positioned so as to insure that the central and side chain rails of the dual wheel chain assembly are subjected to even tension during the chain installation procedure and to insure proper location of the respective side chain rails relative to the side walls of the tires of a dual wheel assembly.

After the vehicle has been moved to the extent that the drive wheels rotate one revolution, the tire chain assembly will be positioned peripherally about the dual wheel assembly and the respective connector ends and clasps of the outer chain rail will be disposed in the position for locking connection thereof. After the chain installation tool has been released from the wheel assembly and the chain and removed, the respective clasps of the outer chain rails are engaged and locked, thereby securing the dual wheel chain assembly in locked and secured relation about the periphery of the dual wheels. Typically, the vehicle will be moved in the forward direction for installation of tire chains to the drive wheels of the tractor and will be moved rearwardly for installation of tire chains to the trailer wheel sets because of the mud flaps. The mud flaps of the tractor are typically pivotally supported while the mud flaps of the trailer are typically supported in fixed relation.

Since a positive interlocking relationship is developed between the chain and the hub portion of the dual wheel assembly, the chains can not slip and become inadvertently released from the wheels during installation. Therefore, through the use of two chain installation tools, according to the present invention, the operator of a vehicle is enabled to install both of the dual wheel chain assemblies about the dual wheels at the same time.

Further objects and advantages which are inherent in the invention will become obvious upon an understanding of the detailed description set forth hereinbelow.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

FIG. 1 is an isometric illustration of a tool for installation of tire chains on dual wheels which is constructed in accordance with the present invention.

FIG. 2 is an isometric illustration of one of the dual wheel assemblies of a truck or tractor having the tool of FIG. 1 structurally interlocked therewith and showing a dual wheel tire chain assembly being attached at one end thereof to the tool in preparation for installation of the tire chain about the dual wheel assembly.

Figure 3:
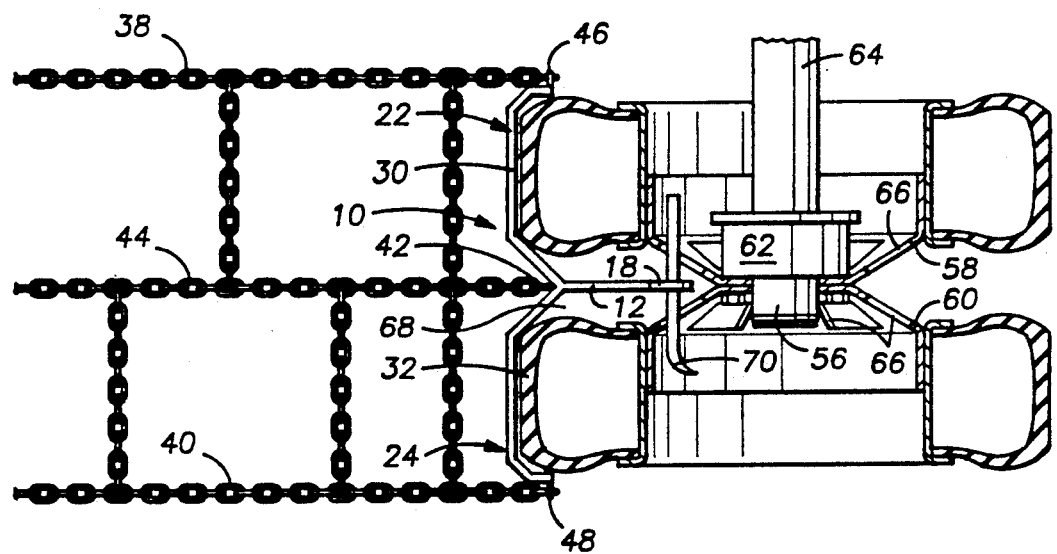

FIG. 3 is a sectional view of the dual wheel assembly of FIG. 2, showing the tool of FIGS. 1 and 2 being structurally interconnected therewith by means of an implement.

Figure 4:
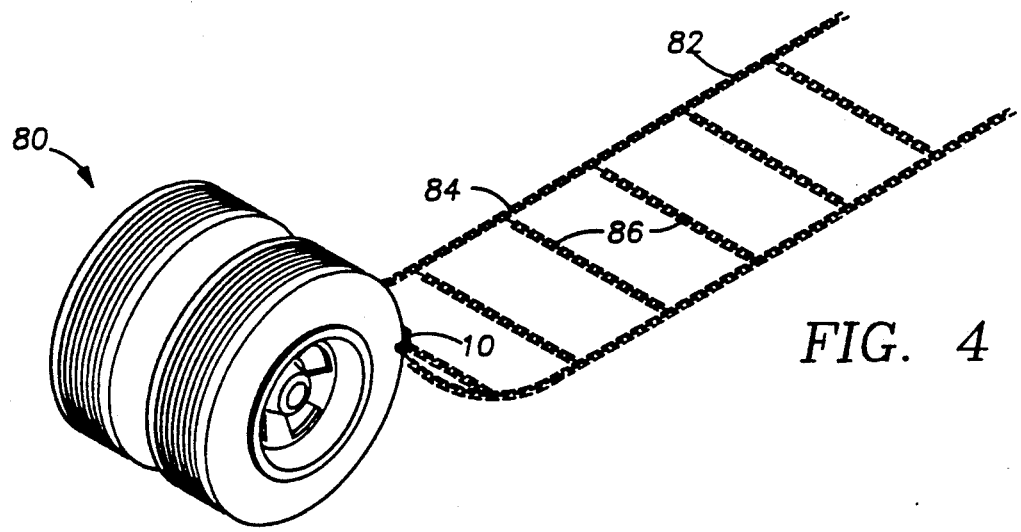

FIG. 4 is an isometric illustration of one of the dual wheel assemblies of a trailer, illustrating installation of a two rail tire chain thereto by using the tool shown in FIGS. 1 and 3.

Figure 5:
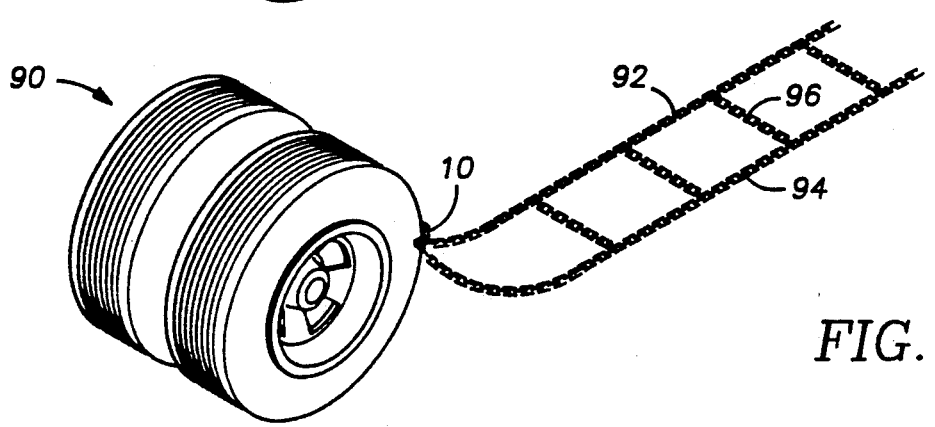

FIG. 5 is an isometric illustration similar to that of FIG. 4 and showing a two rail tire chain being assembled to the outer wheel of the dual wheel assembly.

DETAILED DESCRIPTION OF PREFERRED EMBODIMENT

Referring now to the drawings and first to FIG. 1 a tire chain installation tool constructed in accordance with the present invention is illustrated generally at 10 and incorporates a central projection 12 of elongate, generally straight configuration which defines an inner end 14 and an outer end 16. The inner end 14 is provided with an eye member 18 which defines a central opening 20. The eye member may be formed by bending the inner end of the central projection to form a loop. If desired the eye may be defined by a circular element which is welded or otherwise secured to the inner end of the central projection. The central opening 20 is referred to herein as a tool restraint opening through which is positioned a suitable implement which also passes through at least one of the the openings in the rim of the outer wheel of a dual wheel assembly and preferably passes through aligned openings in both of the rims of each of the dual wheels. This tool restraint implement may be any suitable elongate object such as a bar, the handle of a hammer, or any other other elongate, straight object of sufficient structural integrity to withstand the forces that will be applied thereto during tire chain installation.

A pair of side projections, 22 and 24 extend in opposed directions from the outer end 16 of the central projection. Each of these side projections include a connector element such as shown at 26 and 28. The connector elements are oriented in diverging relation. The side projections also form tread sections 30 and 32 which are typically slightly curved so as to overlie and establish intimate engagement with the curved tread portion of the respective dual wheel tire that is engaged thereby. From each of the tread sections extend chain positioner elements 34 and 36 respectively, having portions which are disposed in angulated relation with respective tread sections such that the chain positioner elements are enabled to extend along the side walls of the tires to the typical circumference that will be established by the side chain rails 38 and 40 of a dual wheel tire chain assembly, such as that illustrated in FIG. 2. For connection of the tire chain assembly to the tool 10, and for orientation of the central and side chain rails of the tire chain assembly, the tool 10 is provided with a central tire chain connector 42 which is located at the outer end 16 of the central projection 12, substantially at the juncture of convergence established by the connector elements 26 and 28 with the outer end 16. The chain connector element 42 is typically in the form of a hook or loop which receives one of the chain links of the central chain rail 44 of the chain assembly in releasable connection therewith.

Each of the terminal portions 35 and 37 of the chain positioner elements 34 and 36 are provided with outboard chain connectors 46 and 48 which may be in the form of hooks, split "C" rings or loops as desired which form an opening of slightly greater dimension than the thickness of the material forming the tire chain. The outboard chain connectors are so located by the respective chain positioner elements 34 and 36 that they cause the side rails of the dual wheel chain assembly to establish a predetermined circumferential dimension at the side wall of the tires. Thus, each of the side chain rails 38 and 40 of the tire chain assembly will establish approximately the same circumference, being less than the tire diameter as the chain assembly is positioned about the dual wheel assembly. Each of the chain connector elements is preferably welded or otherwise fixed respectively to said central projection and side connector elements so that the entire tool structure is preferably a rigid structure. Conversely, movable chain connector elements may be employed if desired.

As illustrated in the isometric illustration of FIG. 2, and in the sectional view of FIG. 3, the dual wheel tire chain installation tool 10 is shown in operative relation with a dual wheel assembly illustrated generally at 50. The dual wheel assembly includes an outer wheel 52 and an inner wheel 54 disposed in side-by-side relation. The tires 52 and 54 are mounted on an axle and hub assembly 56 including inner and outer rims 58 and 60 which are secured by bolting or by other means to a brake drum 62. The brake drum and wheel assembly are supported by an axle 64.

Each of the rims or wheel discs 58 and 60 is provided with a plurality of openings 66 which provide a cooling function and which also enable inspection of the dual wheel assemblies. The openings 66 also minimize the weight of the wheel assemblies by virtue of the metal that is removed. Even further, the valve stem of the inner wheel typically extends through one of the holes 66 thus permitting checking of its air pressure from the outside of the outer wheel.

As shown particularly in FIG. 3, the tool 10 is positioned in retained interconnection with the dual wheel assembly with its elongate central projection 12 extending into the space 68 that is defined between the wheels and hubs of the wheel assembly. An elongated implement 70, such as the handle of a hammer as shown, is extended through the aligned openings 66 of the aligned wheel rim openings of both of the rims 58 and 60 as shown. The implement 70 is also extended through the tool restraint opening 20 of the eye 18 between the wheels and rims of the dual wheel assembly, thus establishing a mechanically interlocked relation of the central projection 12 with the rims of the wheel assembly.

With the tool 10 in the position shown in FIG. 3, the central chain rail 44 of the dual wheel chain assembly is connected to the centrally located connector element 42 while the outer chain rails 38 and 40 of the chain assembly are connected to the respective outboard chain connectors 42, 46 and 48. The dual wheel assembly 50 is then rotated one revolution, thereby causing the chain to be wrapped about the entire periphery of the dual wheel assembly, with the central chain rail 44 and the side chain rails 38 and 40 establishing a chain rail circumference which is of less dimension than the dimension of the outer periphery of the tires of the dual wheel assembly.

When one revolution of the dual wheels is completed, the end portion of the dual wheel chain assembly will be positioned such that the connector latches 72, 74 and 75 are positioned at the respective chain connector elements 42, 46 and 48. The central and side chain rails are then disconnected from the respective chain connector elements 42, 46 and 48 to thus allow the respective ends of the chain assembly to be connected by means of the latches 72, 74 and 75. The tool 10, prior to latching of the ends of the dual wheel chain assembly into assembly, is removed from its structurally interrelated position with the dual wheel assembly simply by removing the restraining element 70 from the wheel openings 66 and the tool restraint opening 20 and disconnecting the chain rails from the respective chain connector elements.

In the event any debris such as snow, ice, mud, etc. is present in the space 68 between the wheels of the dual wheel assembly, this debris, as mentioned above will typically prevent the use of most dual wheel chain installation devices. The chain installation tool of the present invention, however, is of rigid construction, being formed essentially from bar stock composed of steel or other suitable metal. The central projection 12, being of straight, elongate rigid construction, is designed to be capable of being forced through the debris so as to position the eye 18 in registry with the wheel openings 66. The tool is very effective in removal of debris so as to permit installation of the dual wheel tire chains. It is not necessary, therefore, to completely clean out the space 68 between the wheels and tires of the dual wheel assembly even under circumstances where substantial quantity of debris is present in the space.

Referring now to FIG. 4, the isometric illustration shows one of the rear dual wheel assemblies of the trailer portion of a tractor trailer assembly and illustrates a tire chain being installed thereon. Typically, tire chains for the dual wheel assemblies of trailers such as shown at 80 comprise a two rail tire chain assembly incorporation side rails 82 and 84 which are interconnected by means of transverse chains 86. The tool 10 of the present invention may be used to install the tire chains on the trailer wheel assemblies. In this case, however, it is typically appropriate to install the chains in reverse manner as described above in connection with the drive wheels. The vehicle is typically moved forwardly for installation of the tire chains on the drive wheels of the tractor because the mud flaps behind the drive wheels are typically pivotally mounted to the chassis of the tractor and thus may be moved to allow the tool to be installed and the chains to be connected to the tool. In the case of trailer wheels, however, the mud flaps behind the rear dual wheel assemblies of the trailer are typically fixed to the trailer chassis thus making tire chain installation difficult. The trailer is typically moved rearwardly one full tire revolution to enable the tire chains to be installed on the rear wheels of the trailer.

As shown in FIG. 4 the tire chain is positioned on the ground forwardly of the wheel and one end is connected to the chain installation tool 10 as shown. When the vehicle is then backed the chain assembly will be wrapped over the top of the tires. When a complete revolution of the dual wheel assembly has been accomplished, the chain ends can be connected, after which the tool can be released and removed. As shown in FIG. 5 a chain set for single trailer wheels may be installed with equal efficiency through use of the chain installation tool of this invention. As shown the tire chain set 90 includes inner and outer chain rails 92 and 94 having cross chains 96 connected therebetween. The ends of the rails are connected to the outer and center connectors 48 and 42 of the tool to facilitate installation. With the chain set then positioned on the ground forwardly of and in alignment with the outer wheel of the dual wheel assembly, the vehicle is backed sufficiently to induce one complete rearward revolution of the dual wheel as described above in connection with FIG. 5. The ends of the chain rails will then be connected together to secure the chain set about the wheel and the chain installation tool will then be released from the wheel and removed.

The tool of the present invention provides for efficient installation of tire chains on both the dual drive wheel assemblies of a tractor and the dual wheel assemblies of a trailer without requiring the driver of the vehicle to apply significant force during installation. The "drive on" assembly of the tire chains to the dual wheel assemblies allows the driver to quickly and efficiently install the tire chains without engaging in activity that could cause back injuries. Thus, the workman's compensation claims and medical insurance claims that are prevalent in the industry because of injuries that occur during installation of tire chains can be effectively minimized through use of the tool of the present invention.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms and sizes without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A tool for installation of dual wheel tire chains having a pair of side chain rails and a central chain rail being interconnected by tread chain rails on the dual drive wheels of trucks or tractors having wheel rims formed with openings therein, said tool comprising:
   (a) a central projection forming an inner end and adapted to extend into the space between the dual tires and rims of a dual drive wheel and forming a tool restraint opening at said inner end for registry with at least one of said openings in said wheel and for receiving an implement extended through said openings for temporarily locking said central projection to said wheels, said central projection having a chain connector thereon for releasable connection of said central chain rail thereto; and
   (b) a pair of side projections extending in opposed directions from said central projection and adapted to extend over the treads of respective ones of the tires of said dual wheel assembly, each of said side projections having chain connectors thereon for releasable connection of said side chain rails respectively thereto.

2. The tool of claim 1, wherein:
said central projection and said side projections form a rigid, integral assembly.

3. The tool of claim 1, wherein:
said side projections are each of generally U-shaped configuration.

4. The tool of claim 3, wherein:
said side projections each extend in diverging relation from one end of said central projection.

5. The tool of claim 1, wherein:
   (a) said side projections each define chain positioner elements that are adapted for positioning the respective side rails of said tire chains along the side walls of the tires of said dual drive wheel assembly; and
   (b) said chain connector elements being located at the terminal extremities of said chain positioner elements and thus being positioned to orient the side chain rails of said dual wheel tire chain to form outer chain rail peripheries during installation of said dual wheel tire chains that are of less dimension than the dimension of the peripheries defined by the tires of the dual wheel assembly.

6. The tool of claim 5, wherein:
said central chain connector is located by said central projection at a position for orienting said central chain rail of a dual wheel tire chain so as to establish a central chain rail periphery of greater dimension than the peripheries of said side chain rails and less dimension than that established by the outer peripheries of the tires of said dual wheel assembly.

7. The tool of claim 1, wherein:
said central projection forms an inner extremity adapted for positioning toward the axis of rotation of said dual wheel assembly and an outer extremity adapted for positioning near the outer periphery of said dual wheel assembly, said inner extremity of said central projection forming an eye defining said tool restraint opening.

8. The tool of claim 7, wherein:
said eye is defined by a generally circular loop at said inner extremity of said central projection.

9. The tool of claim 1, wherein:
said central chain connector and said side chain connectors are disposed in rigidly connected relation with said side projections and are of generally C-shaped configuration forming an opening of slightly greater dimension than the thickness of the material from which the chain links of said dual wheel chain assemblies are formed.

10. The tool of claim 1, wherein:
said side projections are each of generally U-shaped configuration and are disposed for positioning about the tires of said dual drive wheels.

11. A tool for installation on dual drive wheels and dual trailer wheels having rims with openings therein and tires thereon, dual wheel tire chain assemblies having at least a pair of outer circumferential chain rails each having connector links at the ends thereof and being interconnected by a plurality of transverse chain rails, said tool comprising:
   (a) an elongate, generally rigid central projection forming an inner free end and an outer end and adapted to extend into the space between the dual tires and rims of a dual drive wheel assembly and forming a tool restraint opening at said free end for registry with both of said openings in said rims and for receiving an implement extended through said opening in said rims for temporarily locking said central projection to said rims, said central projection having a central chain connector thereon for receiving the connector link of said central circumferential chain rail;
   (b) a pair of side projections disposed in rigid integral assembly with said central projection, each of said side projections forming connector elements being integral with said outer end of said central projection, each of said side projections also forming a tread section adapted to engage the respective treads of the tires of said dual drive wheel assembly, each of said side projections further defining chain positioner elements adapted to project along the outer side walls of said tires and to be oriented generally radially toward the axis of rotation of said dual wheel assembly; and
   (c) a pair of side chain connectors each being located at the respective free extremities of said chain positioner elements for positioning of said outer circumferential chain rails to define an outer chain rail periphery of less dimension than the outer periphery of said tires of said dual drive wheels and trailers.

12. The tool of claim 11, wherein:
said side projections are each of generally U-shaped configuration.

13. The tool of claim 12, wherein:

said side projections each extend in diverging relation from one end of said central projection.

14. The tool of claim 11, wherein:
(a) said side projections each define chain positioner elements that are adapted to extend along the side walls of the tires of said dual drive wheel assembly; and
(b) said chain connectors being located at the terminal extremities of said chain positioner elements and thus being positioned to orient the side chain rails of a dual wheel tire chain assembly to form a chain rail periphery during installation that is of less dimension than the periphery defined by the tires of the dual wheel assembly.

15. The tool of claim 12, wherein:
said central chain connector is located by said central projection at a position for orienting said central chain rail of a dual wheel tire chain assembly so as to establish a central chain rail periphery of greater dimension than the peripheries of said side chain rail and of less dimension than that established by the outer peripheries of the tires of said dual wheel assembly.

16. The tool of claim 11, wherein:
said central projection forms an inner extremity adapted for positioning near the axis of rotation of said dual wheel assembly and an outer extremity adapted for positioning near the outer periphery of said dual wheel assembly, said inner end of said central projection forming an eye defining said tool restraint opening.

17. The tool of claim 16, wherein:
said eye being defined by a generally circular loop at said inner extremity of said central projection.

18. The tool of claim 11, wherein:
said central chain connector and said side chain connectors are disposed in rigidly connected relation with said central projection and said side projections respectively and are of generally C-shaped configuration forming an opening of slightly greater dimension than the cross-sectional dimension of the material from which the chain links of said dual wheel chains are formed.

* * * * *